United States Patent
Jang et al.

(10) Patent No.: US 12,288,347 B2
(45) Date of Patent: Apr. 29, 2025

(54) METHOD AND APPARATUS WITH DEPTH MAP GENERATION

(71) Applicant: SAMSUNG ELECTRONICS CO., LTD., Suwon-si (KR)

(72) Inventors: Seokhwan Jang, Anyang-si (KR); Seungeon Kim, Incheon (KR); Minjung Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 626 days.

(21) Appl. No.: 17/714,347

(22) Filed: Apr. 6, 2022

(65) Prior Publication Data

US 2023/0103967 A1    Apr. 6, 2023

(30) Foreign Application Priority Data

Oct. 1, 2021    (KR) .................. 10-2021-0130985

(51) Int. Cl.
*G06T 7/55*    (2017.01)
*G06T 7/73*    (2017.01)

(52) U.S. Cl.
CPC .............. *G06T 7/55* (2017.01); *G06T 7/73* (2017.01); *G06T 2207/10024* (2013.01); *G06T 2207/10028* (2013.01); *G06T 2207/20084* (2013.01)

(58) Field of Classification Search
CPC ... G06T 7/55; G06T 7/73; G06T 2207/10024; G06T 2207/10028; G06T 2207/20084;
(Continued)

(56) References Cited

U.S. PATENT DOCUMENTS 10,796,201 B2 * 10/2020 Li .................... G06F 18/2148
10,916,035 B1 *  2/2021 Kroeger ............. G05D 1/0212
(Continued)

FOREIGN PATENT DOCUMENTS

EP    3683721 A1 *  7/2020 ........... B25J 9/1697
JP    2018081008    *  5/2018
(Continued)

OTHER PUBLICATIONS

Yao, et al. "Mvsnet: Depth Inference for Unstructured Multi-View Stereo." *Proceedings of the European Conference on Computer Vision (ECCV)*. Jul. 17, 2018. pp. 1-17.
(Continued)

*Primary Examiner* — Jerome Grant, II
(74) *Attorney, Agent, or Firm* — NSIP Law

(57) ABSTRACT

A method and apparatus with depth map generation. The method may include generating points for a point cloud by unprojecting multi-view depth maps, of plural views, into a corresponding three-dimensional (3D) space using respective camera parameters corresponding to each view of the multi-view depth maps, extracting feature embedding vectors corresponding to the generated points, generating a two-dimensional (2D) feature map of a set view based on the extracted feature embedding vectors, generating a residual depth map using a refinement network with respect to the 2D feature map, generating a new depth map based on the residual depth map and an initial depth map, of the set view, among the multi-view depth maps.

32 Claims, 9 Drawing Sheets

(58) Field of Classification Search
CPC .... G06T 7/596; H04N 13/128; H04N 13/122; H04N 13/271
USPC ......................................................... 382/154
See application file for complete search history.

(56) References Cited

U.S. PATENT DOCUMENTS

| | | |
|---|---|---|
| 11,340,079 B1* | 5/2022 | Ebrahimi Afrouzi ........................ G01C 21/188 |
| 2020/0226773 A1 | 7/2020 | Gan et al. |
| 2021/0134048 A1 | 5/2021 | Weng et al. |
| 2022/0180548 A1* | 6/2022 | Li .............................. G06T 7/10 |

FOREIGN PATENT DOCUMENTS

| | | |
|---|---|---|
| KR | 10-1663819 B1 | 10/2016 |
| KR | 10-1901495 B1 | 9/2018 |
| KR | 10-2110690 B1 | 5/2020 |
| KR | 10-2021-0058320 A | 5/2021 |
| WO | WO 2010/021666 A1 | 2/2010 |

OTHER PUBLICATIONS

Cheng, Shuo, et al. "Deep stereo using adaptive thin vol. representation with uncertainty awareness." *Proceedings of the IEEE/CVF Conference on Computer Vision and Pattern Recognition.* Apr. 18, 2020. pp. 2524-2524.

Chen, Rui, et al. "Point-based multi-view stereo network." *Proceedings of the IEEE/CVF International Conference on Computer Vision.* 2019. pp. 1538-1547.

\* cited by examiner

METHOD AND APPARATUS WITH DEPTH MAP GENERATION

CROSS-REFERENCE TO RELATED APPLICATIONS

This application claims the benefit under 35 USC § 119(a) of Korean Patent Application No. 10-2021-0130985, filed on Oct. 1, 2021, in the Korean Intellectual Property Office, the entire disclosure of which is incorporated herein by reference for all purposes.

BACKGROUND

1. Field

The following description relates to a method and apparatus for improving a depth map.

2. Description of Related Art

An object included in an image, e.g., having pixel values of individual intensities of raw pixels data of a sensor, may be identified by using a neural network that internally extracts lower dimensional feature vectors or maps, e.g., through different layers of the neural network, from the image to detect for the object, and which ultimately outputs information about the detected object.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes generating points for a point cloud by unprojecting multi-view depth maps, of plural views, into a corresponding three-dimensional (3D) space using respective camera parameters corresponding to each view of the multi-view depth maps, extracting feature embedding vectors corresponding to the generated points, generating a two-dimensional (2D) feature map of a set view based on the extracted feature embedding vectors, generating a residual depth map using a refinement network with respect to the 2D feature map, and generating a new depth map based on the residual depth map and an initial depth map, of the set view, among the multi-view depth maps.

The method may further include generating the multi-view depth maps using a depth map generation network respectively provided each of a plurality of frames, of multiple views, of a same object, where the depth map generation network may be configured to generate a depth map of a view corresponding to a captured view of a frame, of the plurality of frames, provided to the depth map generation network.

The plurality of frames may include frames with red, green, and blue (RGB) channels.

The extracting of the feature embedding vectors may include, for each of a plurality of positions of the point cloud, extracting a feature embedding vector by concatenating respective features for a corresponding position, of the plurality of positions, and a corresponding point of the generated points, where the respective features for the corresponding position are fetched from each feature map generated with respect to respective final layers of the depth map generation network when respectively generating depth maps, of the multi-view depth maps, that correspond to the corresponding position.

For generating one of the feature embedding vectors, the fetching may include fetching a first feature, for a particular position of the plurality of positions, from a first feature map generated by an intermediary layer of the depth map generation network when generating a first depth map, of the multi-view depth maps, that corresponds to the particular position, and fetching a second feature for the particular position from a second feature map generated by the intermediary layer of the depth map generation network when generating a second depth map, of the multi-view depth map, that corresponds to the particular position.

The generating of the 2D feature map may include generating the 2D feature map of the set view by projecting the feature embedding vectors into an image plane of the set view.

The generating of the residual depth map may include generating the residual depth map by applying a frame, of the plurality of frames, of the set view and the 2D feature map to the refinement network.

The generating of the residual depth map may include generating the residual depth map by adding channels of the frame to the 2D feature map and applying the 2D feature map with the added channels to the refinement network.

The generating of the new depth map may include concatenating the residual depth map and the initial depth map, and generating the new depth map by adjusting any one or any combination of a shift, a scale, and an image quality of a result of the concatenating.

The method may further include repeating, a set number of iterations, a generation of respective points for another point cloud by unprojecting respective multi-view depth maps, including an immediately previous generated respective new multi-view depth map, into the corresponding three-dimensional (3D) space, an extraction of respective feature embedding vectors corresponding to the generated respective points, a generation of a respective two-dimensional (2D) feature map of the set view based on the extracted respective feature embedding vectors, a generation of a respective residual depth map using the refinement network with respect to the respective 2D feature map, and a generation of a respective new depth map based on the respective residual depth map and a corresponding depth map, of the set view, among the respective multi-view depth maps, wherein, in an initial iteration of the set number of iteration, the immediately previous generated respective new multi-view depth map may be the generated new depth map.

The method may further include reconstructing a 2D object, corresponding to the multi-view depth maps, into a 3D object based on the new depth map.

The generating of the 2D feature map may include generating each of plural 2D feature maps, of the plural views, by respectively projecting the feature embedding vectors into respective image planes of the plural views.

The generating of the residual depth map may include generating plural residual depth maps of the plural views, which may include, for each of the generated plural 2D feature maps of the plural views, generating a corresponding residual depth map of a respective view, of the plural views, using the refinement network respectively provided a corresponding 2D feature map of the respective view.

The generating of the new depth map may include generating respective new depth maps of the plural views, which may include, for each of the generated plural residual depth maps, concatenating, with respect to the respective view, the corresponding residual depth map and a corresponding depth map, among the multi-view depth maps, of the respective view, and generating a respective new depth map of the respective view by adjusting any one or any combination of a shift, a scale, and an image quality of a result of the concatenating with respect to the respective view.

The generating of the new depth map may include generating, for each of the generated plural residual depth maps, a respective new depth map of the respective view based on the corresponding residual depth map and a corresponding depth map, among the multi-view depth maps, of the respective view, and the method further may include repeating, a set number of iterations a generation of respective points for another point cloud by unprojecting immediately previous generated respective multi-view depth maps into the corresponding three-dimensional (3D) space, an extraction of respective feature embedding vectors corresponding to the generated respective points, a generation of a respective two-dimensional (2D) feature map of the set view based on the extracted respective feature embedding vectors, a generation of a respective residual depth map using the refinement network with respect to the respective 2D feature map, and a generation of a respective new depth map based on the respective residual depth map and a corresponding depth map, of the set view, among the immediately previous generated respective multi-view depth maps, wherein, in an initial iteration of the set number of iteration, the immediately previous generated respective multi-view depth maps are the generated respective new depth maps.

The extracting of the feature embedding vectors may include extracting, for each of a plurality of the generated points, a feature embedding vector for a respective point by generating a feature of the feature embedding vector based on a first information with respect to a first depth map, of the multi-view depth maps, corresponding to the respective point, and a second information with respect to a different view second depth map, of the multi-view depth maps, corresponding to the respective point.

The generating of the new depth map may include concatenating the residual depth map and the initial depth map, and generating the new depth map by adjusting any one or any combination of a shift, a scale, and an image quality of a result of the concatenating.

The method may further include repeating, a set number of iterations, a generation of respective points for another point cloud by unprojecting respective multi-view depth maps, including an immediately previous generated respective new multi-view depth map, into the corresponding three-dimensional (3D) space, an extraction of respective feature embedding vectors corresponding to the generated respective points, a generation of a respective two-dimensional (2D) feature map of the set view based on the extracted respective feature embedding vectors, a generation of a respective residual depth map using the refinement network with respect to the respective 2D feature map, and a generation of a respective new depth map based on the respective residual depth map and a corresponding depth map, of the set view, among the respective multi-view depth maps, wherein, in an initial iteration of the set number of iteration, the immediately previous generated respective new multi-view depth map may be the generated new depth map.

The method may further include reconstructing a 2D object, corresponding to the multi-view depth maps, into a 3D object based on the new depth map.

In one general aspect, one or more embodiments include a non-transitory computer-readable storage medium storing instructions that, when executed by a processor, cause the processor to perform any one, any combination, or all operations or methods described herein.

In one general aspect, an apparatus includes a sensor, and a processor configured to generate points for a point cloud by unprojecting multi-view depth maps, of plural views, into a corresponding three-dimensional (3D) space using respective camera parameters corresponding to each view of the multi-view depth maps, extract feature embedding vectors corresponding to the generated points, generate a two-dimensional (2D) feature map of a set view based on the extracted feature embedding vectors, generate a residual depth map using a refinement network with respect to the 2D feature map, and generate a new depth map based on the residual depth map and an initial depth map, of the set view, among the multi-view depth maps, wherein the sensor is configured to capture, with a same object, the multi-view depth maps or a plurality frames, of multiple views, for generating the multi-view depth maps.

The sensor may capture the plurality of frames, and the processor may be further configured to generate the multi-view depth maps using a depth map generation network respectively provided each of a plurality of frames.

The apparatus may further include a communication interface configured to output the new depth map, and receive the plurality of frames.

For the extracting of the feature embedding vectors, the processor may be configured to, for each of a plurality of positions of the point cloud, extract a feature embedding vector by concatenating respective features for a corresponding position, of the plurality of positions, and a corresponding point of the generated points, where the respective features for the corresponding position are fetched from each feature map generated with respect to respective final layers of the depth map generation network when respectively generating depth maps, of the multi-view depth maps, that correspond to the corresponding position.

For the generating of the residual depth map, the processor may be configured to generate the residual depth map by applying a frame, of the plurality of frames, and the 2D feature map to the refinement network.

The processor may be configured to repeat, a set number of iterations a generation of respective points for another point cloud by unprojecting respective multi-view depth maps, including an immediately previous generated respective new multi-view depth map, into the corresponding three-dimensional (3D) space, an extraction of respective feature embedding vectors corresponding to the generated respective points, a generation of a respective two-dimensional (2D) feature map of the set view based on the extracted respective feature embedding vectors, a generation of a respective residual depth map using the refinement network with respect to the respective 2D feature map, and a generation of a respective new depth map based on the respective residual depth map and a corresponding depth map, of the set view, among the respective multi-view depth maps, wherein, in an initial iteration of the set number of iteration, the immediately previous generated respective new multi-view depth map may be the generated new depth map.

The processor may be configured to reconstruct a 2D object, corresponding to the multi-view depth maps, into a 3D object based on the new depth map.

In one general aspect, an apparatus includes a processor configured to, for each of a plurality of positions for a point cloud, extract a feature embedding vector based on respective features for a corresponding position, of the plurality of positions, and a corresponding point of a plurality of points for the point cloud, where the respective features for the corresponding position are based on features extracted from respective depth maps, of multi-view depth maps of plural views with a same object, that correspond to the corresponding position, generate a two-dimensional (2D) feature map of a set view based on the extracted feature embedding vectors, generate a residual depth map using a refinement network with respect to the 2D feature map, and generate a new depth map based on the residual depth map and an initial depth map, of the set view, among the multi-view depth maps.

The processor may be further configured to generate the plurality of points for the point cloud by unprojecting the multi-view depth maps into a corresponding three-dimensional (3D) space using respective camera parameters corresponding to each view of the multi-view depth maps.

The apparatus may further include a sensor configured to capture the multi-view depth maps, wherein, for each of the plurality of positions for the point cloud, the features extracted from respective depth maps may include features extracted within the depth map generation network when generating the respective depth maps that correspond to the corresponding position.

The apparatus may further include a sensor configured to capture a plurality of frames of multiple views, wherein the processor may be further configured to generate the multi-view depth maps using a depth map generation network respectively provided each of a plurality of frames with the same object, wherein the depth map generation network may be configured to generate a depth map of a view corresponding to a captured view of a frame, of the plurality of frames, provided to the depth map generation network, and wherein, for each of the plurality of positions for the point cloud, the features extracted from respective depth maps may include features extracted within the depth map generation network when generating the respective depth maps that correspond to the corresponding position.

The processor may be further configured to reconstruct a 2D object, corresponding to the multi-view depth maps, into a 3D object based on the new depth map.

Other features and aspects will be apparent from the following detailed description, the drawings, and the claims.

Figure 1:
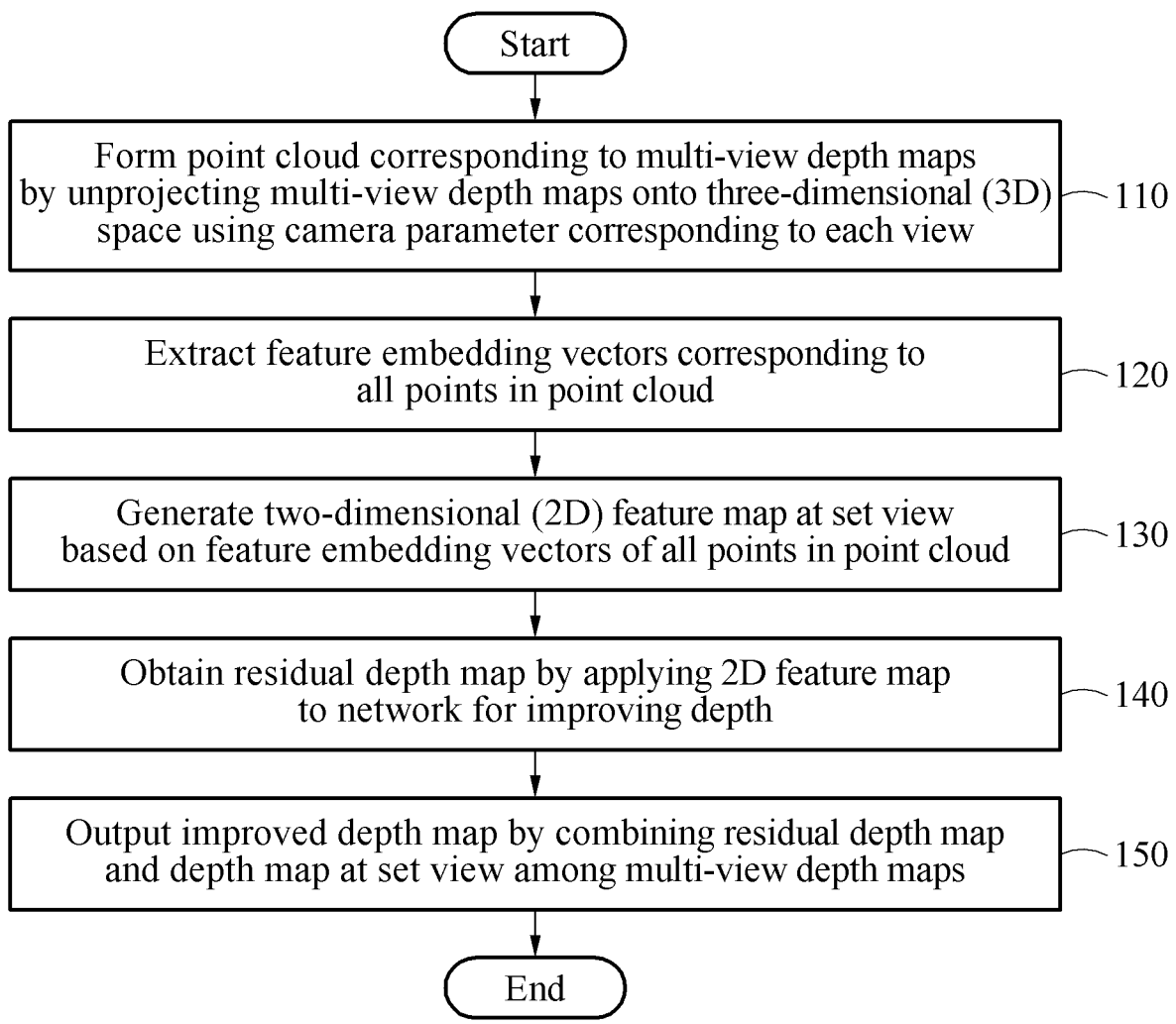
FIG. 1 illustrates an example method with depth map improvement, according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example method with depth map improvement, according to one or more embodiments. In the following examples, operations may be performed sequentially, but may not necessarily be performed sequentially. For example, the operations may be performed in different orders, and at least two of the operations may be performed in parallel.

Referring to FIG. 1, a computing apparatus may generate a depth map that improves upon an original depth map though operations 110 to 150, as a non-limiting example.

Figure 2:
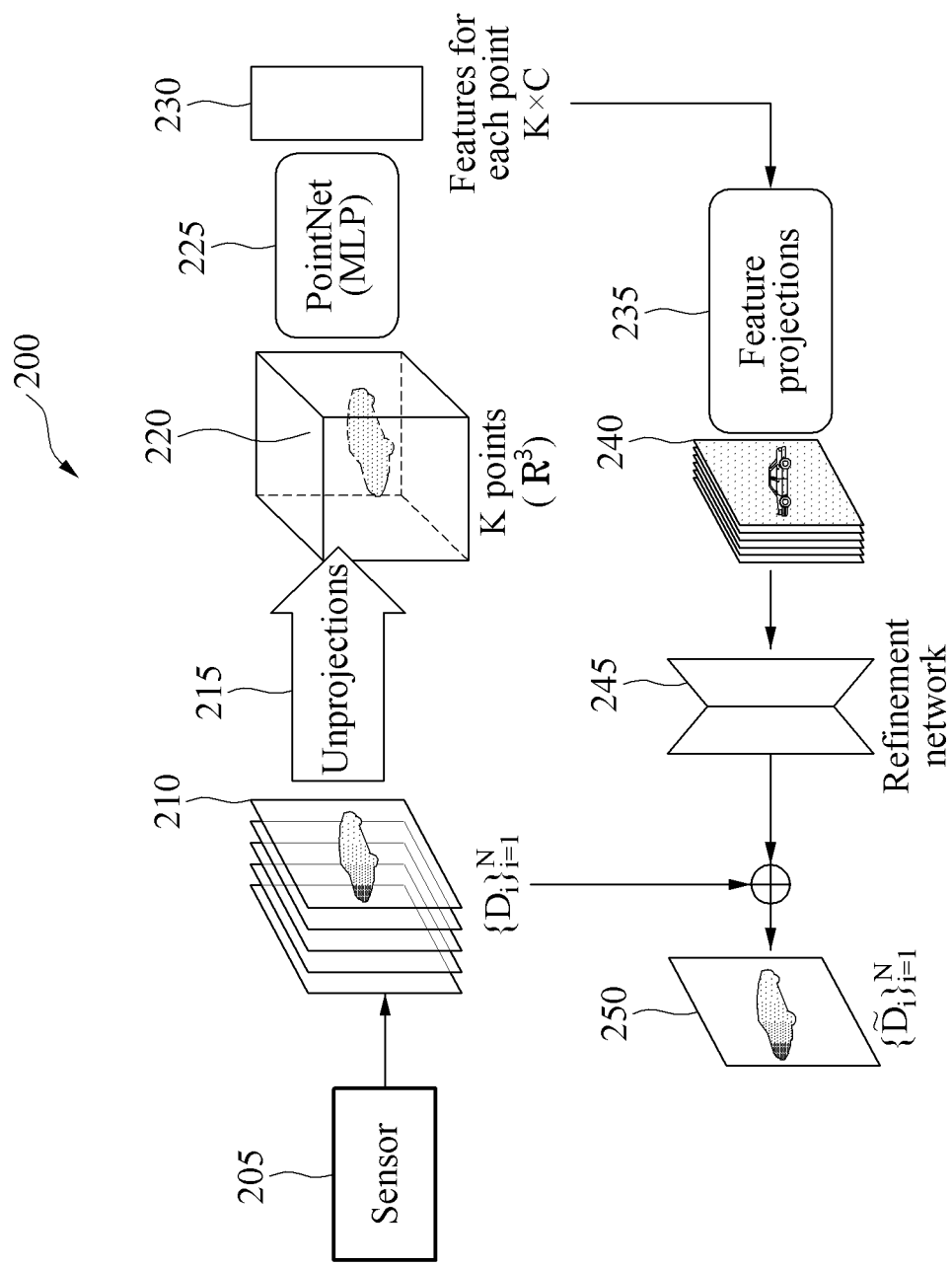
FIG. 2 illustrates an example computing apparatus with depth map improvement, according to one or more embodiments.
Figure 4:
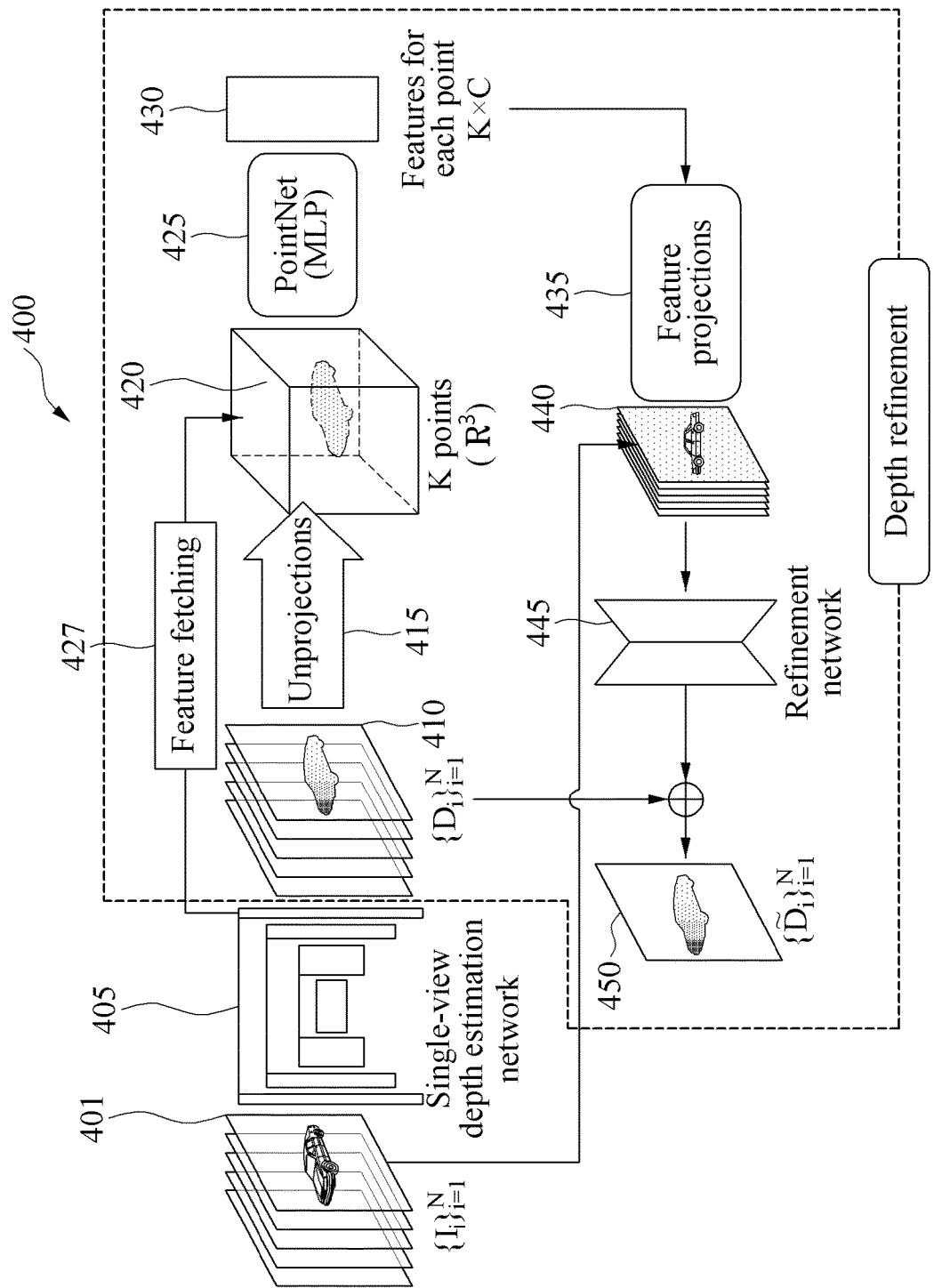
FIG. 4 illustrates an example computing apparatus with depth map improvement, according to one or more embodiments.
Figure 7:
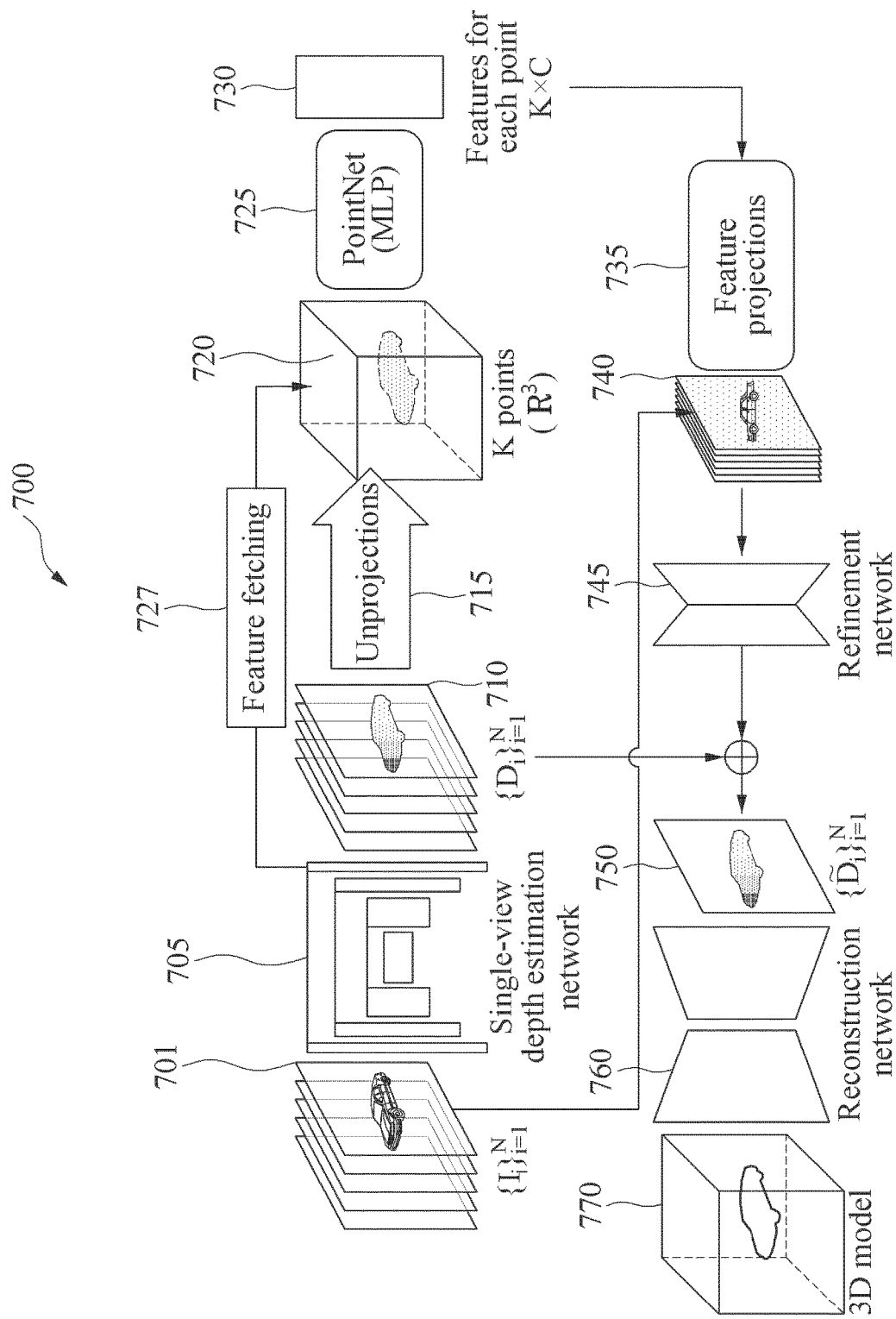
FIG. 7 illustrates an example computing apparatus with depth map improvement, according to one or more embodiments.
Figure 9:
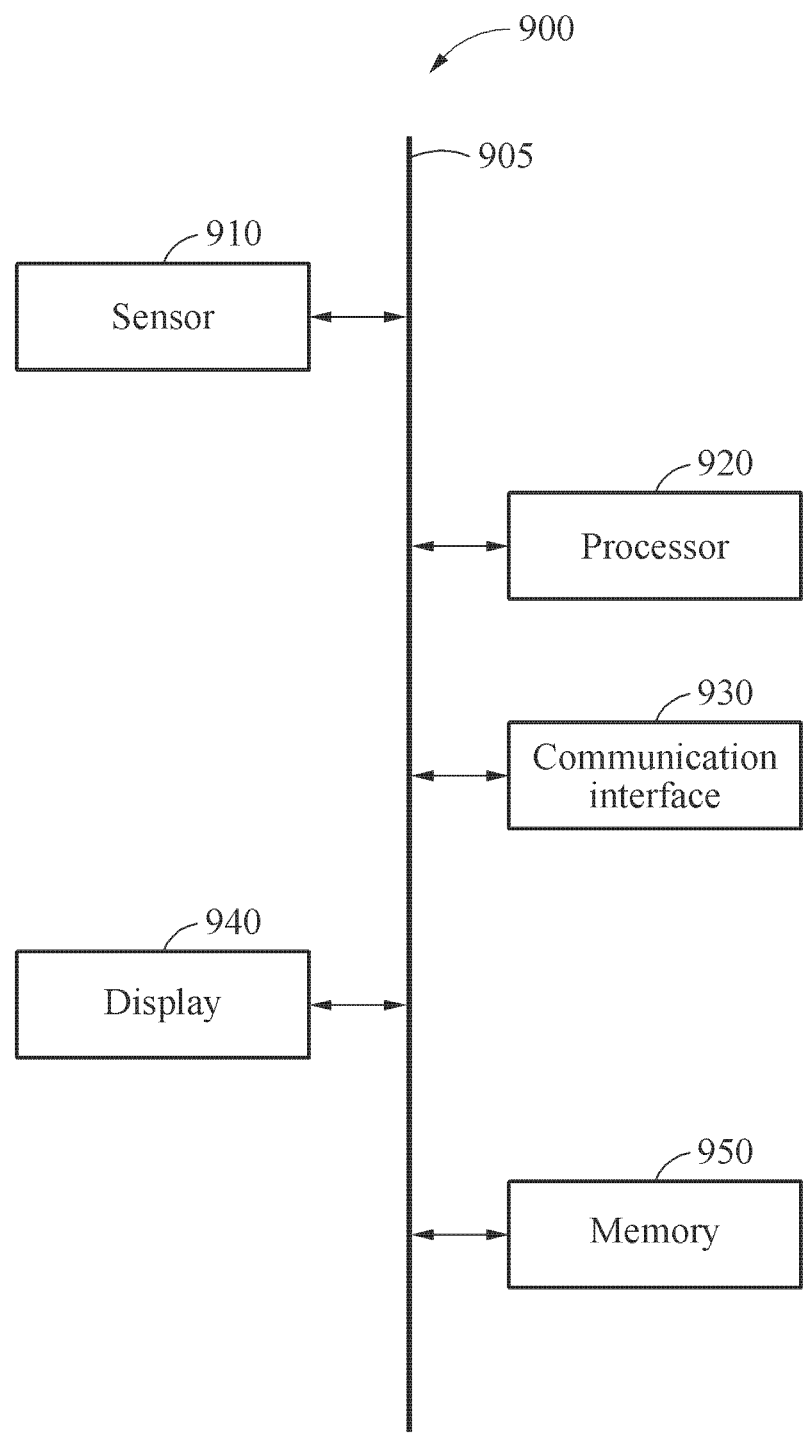
FIG. 9 illustrates an example computing apparatus with depth map improvement, according to one or more embodiments.

For example, the computing apparatus may be any one or any combination of the computing apparatus 200 of FIG. 2, the computing apparatus 400 of FIG. 4, the computing apparatus 700 of FIG. 7, and the computing apparatus 900 of FIG. 9 or the processor 920 (or at least processor 920 and memory 950) of FIG. 9, noting that examples are not limited thereto.

In operation 110, the computing apparatus may form a point cloud corresponding to multi-view depth maps by unprojecting the multi-view depth maps into/onto a three-dimensional (3D) space using respective camera parameters and/or camera positions corresponding to each view.

For example, the multi-view depth maps may correspond or refer to plural single view depth maps capturing respective depth maps from different views that include a same object. The single view depth map of the multi-view depth maps may be obtained or captured, for example, by one or more depth sensors, one or more light detecting and ranging (LiDAR) sensors, and/or one or more depth cameras, but examples are not limited thereto. In an example, the computing apparatus may include any one or combination of the one or more depth sensors, the one or more light detecting and ranging (LiDAR) sensors, and/or one or more depth camera, and may capture some or each of the single view depth maps using same and/or different sensors or cameras, and/or some or all of the single view depth maps may be provided to the computing apparatus, e.g. as captured by one or more sensors or cameras of the computing apparatus at a previous time or by another computing apparatus.

A camera parameter may be a parameter of a sensor capturing a single view depth maps or literally, a parameter of the corresponding camera with the sensor at or corresponding to the time the single view depth map is captured. Likewise, with plural single view depth maps of different views, there may be respective camera parameters of the respective sensors or cameras that capture each of the respective single view depth maps of the different views. The camera parameter may be a parameter of the sensor or camera with respect to a corresponding view of a captured depth map relative to a captured object in the captured depth map, e.g., distinguished from camera parameters with respect to other views relative to the captured object in other captured depth maps.

As another example, the camera parameter may be a parameter of a sensor capturing an image of a particular view, or literally, a parameter of the corresponding camera with the sensor at or corresponding to the time the image is captured. The camera parameter may be a parameter of the sensor or camera with respect to a corresponding view of a captured image relative to a captured object in the captured image, e.g., distinguished from camera parameters with respect to other views relative to the captured object in other captured images. A single view depth map of the particular view may be generated from the captured image of the particular view, and the camera parameter of the captured image may also be the camera parameter of the generated single view depth map. In an example, the computing apparatus may include any one or any combination of one or more of the sensors and/or one or more of the cameras, and may capture some or each of the images, e.g., as 2D images, using same and/or different sensors or cameras, and/or some or all of the single view depth maps may be provided to the computing apparatus, e.g. as captured by one or more sensors or cameras of the computing apparatus at a previous time or by another computing apparatus. The captured images may each or some be single channel 2D images, e.g., as a luminance or other intensity image, black/white image, or grayscale image, or may additionally or alternatively include one or more color information and/or one or more color information channels, all as non-limiting examples.

As noted, when each of the single view depth maps of different views are captured, there may be respective camera parameters and/or camera positions of the respective sensors or cameras capturing each of the single view depth maps. Likewise, when each of the plural images of different views are captured, there may be respective camera parameters and/or camera positions of the respective sensors or cameras capturing each of the plural images and each of the plural images may be respectively used to generate a corresponding single view depth map of a corresponding different view. The respective camera parameter and/or camera position of each of the plural images may also be the respective camera parameter and/or camera position of the corresponding single view depth map respectively generated from each of the plural images.

Herein, each camera parameter may include, for example, any one or any combination of an intrinsic parameter and an extrinsic parameter As noted above, in an example, the computing apparatus may generate, e.g., intuitively estimate, each of the single view depth maps having different views, which may be collectively referred to as the multi-view depth maps, by applying each of a plurality of frames capturing different views of the same object to a model configured to estimate a single view depth map from an input image. As an example herein, the generation of a single view depth map by such a model may include intuitively estimating the single view depth map. In an example, the model may be a machine learning or other model. Here, as a non-limiting example and only for convenience of explanation such an example model for generating a single view depth map will be referred as a "network" for estimating a single view depth map. In an example, the network may be neural network. As a non-limiting example, the network may be the network 405 of FIG. 4, which is configured to respectively generate each of the multi-view depth maps 410, i.e., each of the single view depth maps of the multi-view depth maps 410. In an example, the multi-view depth maps may include a total number of single view depth maps corresponding to the total number of different views of the plurality of frames. As noted above, each of the plurality of frames may be, for example, a red, green, and blue (RGB) image or image with respective R, G, and B channels, such as captured by different R, G, and B sensor elements of a corresponding sensor. In an example, image frame(s) of a same view may be input to the network, e.g., network 405, where the network 405 may be configured to output a single view depth map. Likewise, image frames of respectively different views may be respectively input to the example network 405, and the single view depth maps of the corresponding different views may be respectively output, and collectively referred to (or collected) as the multi-view depth maps. For example, when an image frame capturing a first view of an object A is applied, the network for generating the single view depth map may generate a single view depth map of the first view corresponding to the image frame, and when another image frame capturing another view of the object A is applied, the network may generate another single view depth map of the other view corresponding to the other image frame. Thus, a plurality of single view depth maps may be respectively generated for image frames capturing different views of the object A and collected to form the multi-view depth maps. Such a network for generating a single view depth map from a single input frame may be, for example, a U-Net, but is not limited thereto.

In operation 110, the computing apparatus may calculate positions of three-dimensional (3D) points corresponding to pixels of the 2D object in each of the captured or generated single view depth maps by unprojecting each of the multi-view depth maps, i.e., each of the single view depth maps of the multi-view depth maps, into 3D space using a corresponding camera parameter and/or corresponding camera position. The computing apparatus may form the point cloud corresponding to the multi-view depth maps based on the positions of the 3D points in the point cloud. As a non-limiting example, points P included in the point cloud may include, for example, 3D position information such as P (x, y, z) for each of the multi-view depth maps.

In operation 120, the computing apparatus may extract feature embedding vectors corresponding to points, e.g. all points, in the point cloud formed in operation 110, e.g., dependent on the unprojectings of the multi-view depth maps. For example, the computing apparatus may extract the feature embedding vectors using a point model, such as machine learning model or other model, by considering some or all of the results of the unprojecting of each of the multi-view depth maps. Here, as a non-limiting example and only for convenience of explanation, this point model may be referred to as a "point network". In an example, the point network may be the point network 225 illustrated in FIG. 2 and/or the point network 425 illustrated in FIG. 4. In an example, the point network may include a multi-layer perceptron (MLP) and a pooling layer, as a non-limiting example. In an example, the point network may be a neural network. In the example of FIG. 4, when a particular single view depth map of a particular view, among the multi-view depth maps 410, is generated by network 405 from a corresponding input image of the particular view, e.g., of the input images 401 of the object from the different views, the computing apparatus may fetch or forward features corresponding to a position of each point in the point cloud, e.g., a point cloud 420 illustrated in FIG. 4, with respect to the unprojecting of the particular single view depth map, from a feature map of a final layer, for example, of the network 405 when the network 405 is generating the single view depth map of the particular view, similar to feature fetching 427 illustrated in FIG. 4. For example, "feature fetching" may refer to fetching or forwarding of features corresponding to a position of a corresponding point in a point cloud from a corresponding feature map of (or with respect to) a corresponding final layer of the network when generating a corresponding single view depth map of the multi-view depth maps using the network for generating a single view depth map. In an example, the feature map with respect to the final layer of the network 405 may be a feature map output or generated by another layer of, or a layer immediately, before the network 405 outputs or generates the single view depth map, but is not limited thereto. This feature fetching may be respectively performed with respect to respective features of each of the multi-view depth maps. The computing apparatus may concatenate the respectively fetched features and each point of a position corresponding to the point cloud, and extract the feature embedding vectors.

In operation 130, the computing apparatus may generate a 2D feature map from a set view based on the feature embedding vectors of all points in the point cloud. The computing apparatus may project the feature embedding vectors into/onto an image plane of the set view and generate the 2D feature map for the set view.

For example, the computing apparatus may reproject vector type features obtained by applying feature embedding to all points in the point cloud, that is, the feature embedding vectors into/onto a camera plane (for the set view) and generating the 2D feature map including features having a size of a feature vector. In an example, plural 2D feature maps may also be respectively generated with other views, e.g., with respect to all different views represented in the multi-view depth maps.

In operation 140, the computing apparatus may apply the 2D feature map generated in operation 130 to a refinement model configured to generate a residual depth map. The refinement model may be a machine learning or other model, but for only convenience of explanation will be referred to herein as "refinement network". The refinement network may be a neural network. For example, when the corresponding single view depth maps are respectively generated from each different frame (each of different views) of the input images in operation 110, the computing apparatus may apply a corresponding frame (of a particular view) of the input images and the generated 2D feature map (of the particular view) to the refinement network to generate the residual depth map (with respect to that particular view). In an example, when the corresponding frame includes plural channels, such as red, green, and blue (RGB) channels, the computing apparatus may add or incorporate each of these R, G, and B channels as respective example R, G, and B channels of the 2D feature map, apply the 2D feature map with the added/incorporated channels to the refinement network for improving the depth, and obtain the residual depth map. In an example where plural 2D feature maps are generated, with respect to different views or all different views represented in the multi-view depth maps, the refinement network may be utilized to generate respective residual depth maps for each of the different views.

In operation 150, the computing apparatus may concatenate the residual depth map (of the particular view) obtained in operation 140 and the corresponding depth map (of the particular view) among the multi-view depth maps and output an improved depth map. In an example, when the respective residual depth maps are generated with respect to each of the generated 2D feature maps corresponding to different views, the concatenation may be respectively performed for each residual depth map and each corresponding single view feature map of the same view, to generate plural improved depth maps of the different views. With respect to the respective concatenations to generate the improved depth maps, the computing apparatus may adjust any one of any combination of a shift, a scale, and an image quality of the concatenated feature maps to maintain consistency between views.

The computing apparatus may reconstruct a 2D object corresponding to the improved depth map into a 3D object. The computing apparatus may further generate and/or obtain a 3D model of the object from the RGB image through the reconstructing. In an example, the generation of the 3D model may include intuitively estimating the 3D model.

Accordingly, in one or more embodiments, a depth map may be improved to maintain consistency between views in depth maps of different views through the example above-described reconstructing process for obtaining a 3D model of an object from a 2D image, and thus, one or more embodiments may avoid distortion caused by inconsistent depth information and improve a structure and texture of the depth map, e.g., for generating the improved depth map and/or by improving a particular captured frame based on the improved depth map.

FIG. 2 illustrates an example apparatus with depth map improvement, according to one or more embodiments. Referring to FIG. 2, in an example embodiment, an example computing apparatus 200 may improve an image quality of a depth map while maintaining a view consistency between different views of multi-view depth maps, for example.

For example, the computing apparatus 200 may obtain each (or collectively) single view depth map of multi-view depth maps 210 $\{D_i\}_{i=1}^N$ from a sensor 205. Here, D denotes the initial depth maps, e.g., each of the single view depth maps, and i denotes an index that represents a view with respect to the multi-view depth maps 210 $\{D_i\}_{i=1}^N$, e.g., where $D_1$ through $D_N$ in this particular case may represent respective initial depth maps of different views 1 through N. As a non-limiting example, the sensor 205 may be a LiDAR sensor for detecting a depth value of an object or be a depth sensor.

Typically, when a depth map is obtained by using only one single view image of the particular view, there may be a great difference in a shift and scale of between this depth map and another depth map of a different view because information associated with other views are not used when generating either of the depth map of the particular view or the other depth map of the different view. Accordingly, when each of the depth map of different views are obtained by respectively using only a corresponding single view image of a corresponding different view, there may be a great difference in a shift and scale of between each of the generated depth maps of the different views. Further, when a depth map of each view is unprojected into a 3D space using information of a camera position of each view, depth values for same real world object positions between views may not be accurate. Said another way, parts of the point cloud unprojected from the different views and for different real world positions of the object may overlap in the 3D space, e.g., a point in the point cloud in the 3D space may be determined to correspond to a position on the real world object according to a first depth map while the same point in the point cloud may be inconsistently determined to correspond to a different position on the real world object according to another depth map. With such inconsistent point cloud information an object may not be accurately formed by the point cloud in the 3D space.

In one or more embodiments, an improved depth map may be generated through a depth refinement process. For example, the "improved depth map" may correspond to a depth map that has an improvement over a typically generated depth map whose unprotection into a typical point cloud of a typical 3D space would result in such inconsistent different view-based point cloud information in the 3D space. As another example, the "improved depth map" may be an improved "single view depth map" that corresponds to a single view depth map that has an improvement over a typically generated or captured single view depth map whose unprotection into a typical point cloud of a typical 3D space would result in such inconsistent different view-based point cloud information in the 3D space, and/or which maintains consistency between views in depth maps of different views, as non-limiting examples. Such improved depth maps or improved single view depth map may also or differently provide improvements over other depth map generation approaches.

The computing apparatus 200 may perform respective unprojections 215 of multi-view depth maps 210 $\{D_i\}_{i=1}^N$ into a 3D space for forming a point cloud 220 including K points. Each of the K points may include respective 3D information $R^3$. For each view, the computing apparatus 200 may perform unprojection 215 of a respective single view depth map of the multi-view depth maps 210, using a corresponding camera parameter and/or corresponding camera position information, for the 3D space. For example, the computing apparatus 200 may perform an unprojection 215 of an example one single view depth map (of a particular view) of the multi-view depth maps 210, for obtaining corresponding points P of different respective positions in the point cloud 220 with respect to that one single view depth map of the particular view, using the camera parameter and/or position information corresponding to the capturing of the one single view depth map or the capturing of the single view image of the particular view from which the one single view depth map was generated.

For example, the computing apparatus 200 may obtain respective feature vectors for each position of respective points P, unprojected into the point cloud 220, with respect to each of the views. For example, the computing apparatus 200 may apply feature embedding on the K points in the point cloud 220 and obtain a new feature for each point. In an example, features may be embedded for points, e.g., all points, in the point cloud 220 obtained from the multi-view depth maps 210 $\{D_i\}_{i=1}^N$ through a point network 225, e.g., the point network of FIG. 1. For example, the point network 225 may include various layers such as an MLP and a pooling layer.

The computing apparatus 200 may perform embedding of features for each point in the point cloud 220 and extract a feature embedding vector 230 for each point. For example, when K points are present, K feature vectors may generate K feature embedding vectors, each having a dimension of C×1, that is, the feature embedding vectors 230 for K×C points.

The computing apparatus 200 may perform projection 235 of the feature embedding vectors 230 into a particular set camera plane (of a set view) and generate a 2D feature map 240 with respect to the set camera plane (of the set view). This may be repeated for each of plural different views, e.g., such as for each of the different views in the multi-view depth maps 210, to generate plural 2D feature maps 240, each of a different view. In one example, the 2D feature map 240 may have a size equal to a dimension size of the feature embedding vectors 230.

Accordingly, for example, the computing apparatus 200 may generate the 2D feature map 240 of the set view based on the feature embedding vectors 230 of all points in the point cloud 220.

The computing apparatus 200 may then apply this 2D feature map 240 to a refinement network 245 configured to generate a residual depth map. In an example, the refinement network 245 may be a pretrained U-Net neural network configured to perform segmentation for an image, but is not limited thereto.

The computing apparatus 200 may concatenate the residual depth map and the depth map at the set view among the multi-view depth maps 210 $\{D_j\}_{i=1}^{N}$ and generate an improved depth map 250 $\{\tilde{D}_i\}_{i=1}^{N}$. For example, in the concatenating of the residual depth map and the depth map of the set view among the multi-view depth maps 210 $\{D_i\}_{i=1}^{N}$, the computing apparatus may adjust any one or any combination of a shift, a scale, and an image quality of the result of the concatenation, and generate the improved depth map 250 $\{\tilde{D}_i\}_{i=1}^{N}$ that may maintain consistency between views. In the example when the plural 2D feature maps 240 of different views are generated by respective projections 235, the refinement network 245 may be used to generate corresponding residual depth maps of the different views, which may respectively be concatenated with their corresponding depth map of the same view among the multi-view depth maps 210, for generating the plural multi-view depth maps 250.

Figure 3:
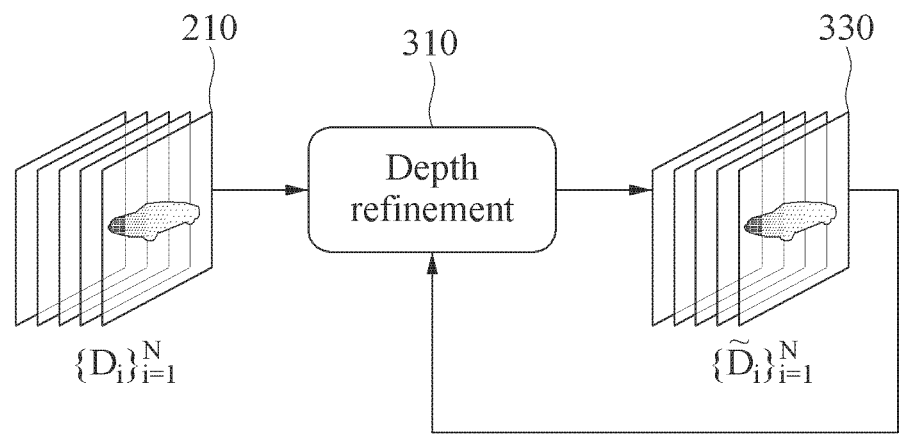
FIG. 3 illustrates an example iterative scheme for improving a depth map, according to one or more embodiments.

FIG. 3 illustrates an example iterative scheme for improving a depth map, according to one or more embodiments.

A computing apparatus may perform depth refinement 310 for multi-view depth maps 210 $\{D_i\}_{i=1}^{N}$, such as through the process described above in FIG. 2, and obtain improved depth maps 330 $\{\tilde{D}_i\}_{i=1}^{N}$. Here, the process of depth refinement 310 may include operations of forming a point cloud, extracting feature embedding vectors, generating plural 2D feature maps, obtaining each of plural residual depth maps, and generating the improved depth maps, e.g., the forming the point cloud 220, the extracting the feature embedding vectors 230, the generating the plural 2D feature maps 240, obtaining the respective residual depth maps, and generating of the improved depth maps 250, as described above in FIG. 2.

The computing apparatus may iteratively perform the depth refinement 310 using the improved depth maps 330 $\{\tilde{D}_i\}_{i=1}^{N}$ output by the depth refinement 310 as an input (instead of the multi-view depth maps 210) and obtain a depth map with more improvements or generate plural depth maps with such more improvements. For example, the computing apparatus may iteratively perform the depth refinement 310 based on a number of iterations set by a user or a preset number of iterations.

FIG. 4 illustrates an example apparatus with depth map improvement, according to one or more embodiments.

A computing apparatus 400 may apply an input image of input images 401 $\{I_i\}_{i=1}^{N}$ to a network 405 (a single view depth generation network, such as the corresponding network discussed above with respect to FIG. 1 for generating a single view depth map of the particular view. The computing apparatus may respectively generate, e.g., with respect to each of the input images 401 of different views, all of the single view depth maps of the different views of the multi-view depth maps 410 $\{D_i\}_{i=1}^{N}$. In an example, the generating by the network may include intuitively estimating a single view depth map from an input image. Here, I denotes a set of RGB images, and D denotes corresponding initial depth maps.

The input images 401 $\{I_i\}_{i=1}^{N}$ may respectively be 2D RGB image frames obtained by capturing N different views of the same object, e.g., a vehicle. Each input image 401 $\{I_i\}_{i=1}^{N}$ may include three channels, e.g., a red channel, a green channel, and a blue channel. The computing apparatus 400 may apply each of the input images 401 of N different views one by one to the network 405 and generate respective depth maps, e.g., respective single view depth maps, corresponding to each of the N different views, which may be collectively referred to (or collected as) the multi view depth maps 410.

The computing apparatus 400 may perform unprojection 415 of each of the multi-view depth maps 410 $\{D_i\}_{i=1}^{N}$ into a 3D space and generate the point cloud 420 including K points. Each of the K points may include 3D information $R^3$. Thus, the computing apparatus 400 may perform unprojection 415 of a depth map of each view among the multi-view depth maps 410 into a 3D space using respective camera parameters and/or respective camera position information of each view, e.g., respective camera or camera position information for when each of the input images 401 were captured.

For example, the computing apparatus 400 may perform unprojection 415 of each depth map, of different views, among the multi-view depth maps $\{D_i\}_{i=1}^{N}$ using each respective camera parameter $\{v_i\}_{i=1}^{N}$ corresponding to each respective input image of a corresponding view such that the multi-view depth maps $\{D_i\}_{i=1}^{N}$ are converted to the point cloud 420 including 3D information. Here, for each input image of a different view, a camera parameter corresponding to a particular input image of a particular view may be construed to as being a respective camera parameter $\{v_i\}_{i=1}^{N}$ of a camera when that camera captured the particular input image. Each of camera parameter $\{v_i\}_{i=1}^{N}$ may include an intrinsic parameter and an extrinsic parameter. For example, the extrinsic parameter may correspond to a rotation/movement conversion matrix for converting a 3D world coordinate system into a camera coordinate system.

The computing apparatus 400 may integrate the single view depth maps respectively generated for each of the input images 401 of all views as the multi-view depth maps 410 and generate point information for the object in the point cloud 420 in a 3D space, that is, obtain 3D information, using the multi-view depth maps 410.

For example, the computing apparatus 400 may perform, for each of the multi-view depth maps 410, unprojection 415 of a point P included in the point cloud 420 into a 3D space using respective camera parameters and/or respective camera positions and obtain a position of the point P in the image space, e.g., for forming respective shapes in the point cloud 420 with respect to the object for each of the views. The computing apparatus 400 may obtain a feature vector at the position of the point P, e.g., for each of the positions of the points P with respect to each of the multi-view depth maps 410. For example, the computing apparatus 400 may perform feature fetching 427 that fetches and pastes a feature vector corresponding to a position of each point that is unprojected into the 3D space using a corresponding feature map of (or with respect to) a corresponding final layer of the network 405 when generating a particular single view depth map of the multi-view depth maps 410, for each of the single view depth maps of the multi-view depth maps 410. In an example, the feature map with respect to the final layer of the network 405 may be a feature map output or generated by another layer, or a layer immediately, before the final layer of the network 405, but is not limited thereto. Said another way, the computing apparatus 400 may generate the point cloud 420 having respective feature vectors for the position of each point by performing the feature fetching 427 for all views.

In an example, the computing apparatus 400 may respectively apply, in addition to the position coordinates, position coordinates x (x, y, z) for each point in the point cloud 420 or a new feature z'(x, z) formed by fetching a feature z of each point obtained through feature fetching 427 to the point network 425, for each of the multi-view depth maps. The point network 225 may be a point-based feature embedding network formed by MLP and a pooling layer that generates the respective embedding vectors.

Typically, when a point cloud is represented based on different views, views may not correlate or information between the views may not correspond, and an object may not be accurately formed in a 3D space. Rather, the computing apparatus 400 may apply feature embedding to K points in the point cloud 420 and obtain a new feature for each point, e.g., dependent on the unprojecting of some or all of the multi-view depth maps. A feature embedding vector may be extracted for each point by embedding a feature for each point through the point network 425. For example, when K points are present, K feature vectors may generate K feature embedding vectors having a dimension of C×1, that is, generate feature embedding vectors 430 for K×C points, such as discussed above with respect to FIG. 2.

The computing apparatus 400 may perform projection 435 of the feature embedding vectors 430 into a plane of a set view and generate a 2D feature map 440 for depth improvement. The computing apparatus 400 may generate the 2D feature map 440 of the set view based on the feature embedding vectors of all points in the point cloud 420. Here, since the 2D feature map 440 of the set view is obtained by projecting points on 3D space, holes having no values may be present in the generated 3D feature map 440. Thus, the corresponding input image 401 $\{I_i\}_{i=1}^{N}$ may be used to supplement the holes having no values in the 2D feature map 440. In an example, the apparatus 400 may perform the projection 435 multiple times with respect to respective planes of plural set views, e.g., of all different views represented in the multi-view depth maps 410, to generate the 2D feature map 440.

The computing apparatus 400 may apply the corresponding input image 401 $\{I_i\}_{i=1}^{N}$ and the 2D feature map 440, both of a same view, to a refinement network 445 for improving a depth by obtaining a corresponding residual depth map. That is, the computing apparatus 400 may concatenate channels of the input image, e.g., including a total of three (RGB) channels and channels of the 2D feature map and apply the concatenated channels to the refinement network 445 for improving the depth. In an example, the network 405 may be trained to perform an intuitive estimating of a depth map of a single view, and the refinement network 445 may be trained to intuitively generate the residual depth map that can be used to improve a corresponding initial depth map. In an example, the refinement network 445 may be a network trained to perform image segmentation.

The computing apparatus 400 may concatenate the residual depth map and the depth map of the set view among the multi-view depth maps 410 and output an improved depth map 450.

In the example when the plural 2D feature maps 440 of different views are generated by respective projections 435, the refinement network 445 may be used to generate corresponding residual depth maps of the different views, which may respectively be concatenated with their corresponding depth map of the same view among the multi-view depth maps 410, to generate plural improved multi-view depth maps 450.

Figure 5:
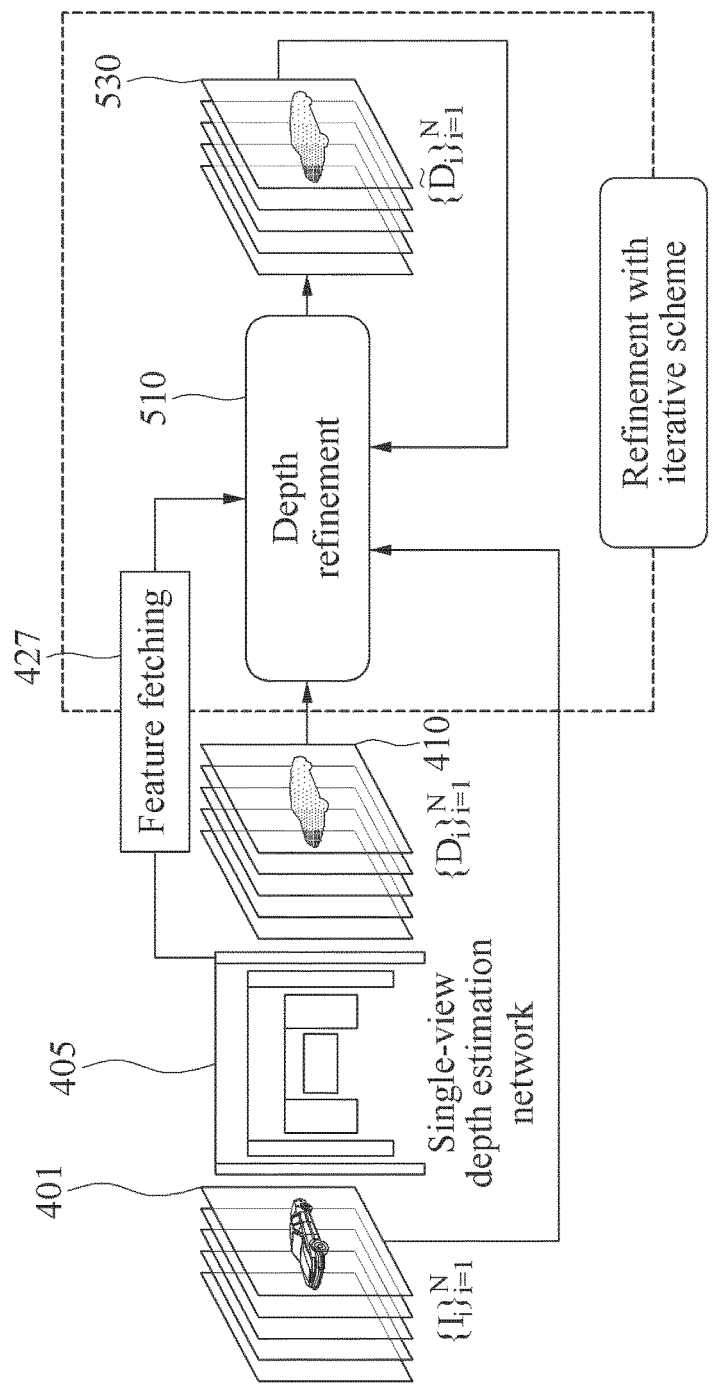
FIG. 5 illustrates an example iterative scheme for improving a depth map, according to one or more embodiments.
Figure 6:
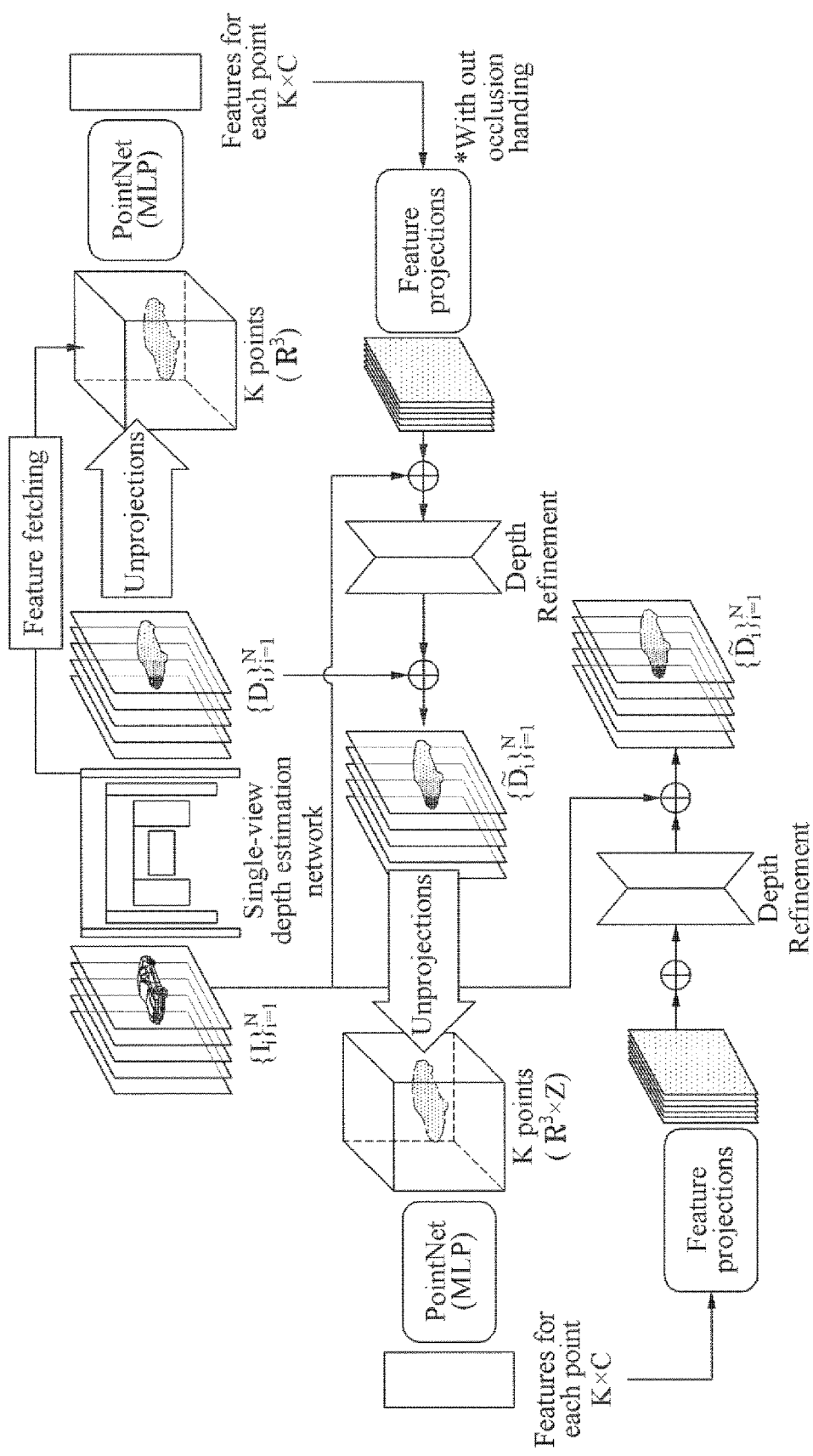
FIG. 6 illustrates an example method with depth map improvement using an example two iterations, according to one or more embodiments.

FIG. 5 illustrates an example iterative scheme for improving a depth map, according to one or more embodiments, and FIG. 6 illustrates an example method with depth map improvement using an example two iterations, according to one or more embodiments.

A computing apparatus may apply the input image 401 $\{I_i\}_{i=1}^{N}$ to the network 405 for generating a depth map of a single view through a process described above with reference reference to FIG. 4, and likewise generate all of the multi-view depth maps 410 $\{D_i\}_{i=1}^{N}$. The computing apparatus may perform depth refinement 510 on the multi-view depth maps 410 $\{D_i\}_{i=1}^{N}$ and obtain improved depth maps 530 $\{\tilde{D}_i\}_{i=1}^{N}$. Here, the depth refinement 510 may include operations of forming a point cloud, extracting feature embedding vectors, generating 2D feature maps, obtaining residual depth maps, and generating the improved depth maps, e.g., forming the point cloud 420, extracting the feature embedding vectors 430, generating the 2D feature maps 440, obtaining the residual depth maps, and outputting the improved depth maps 450, as described in FIG. 4.

The computing apparatus may iteratively perform the depth refinement 510 using the improved depth maps 530 $\{\tilde{D}_i\}_{i=1}^{N}$ output by the depth refinement 510 as an input and obtain depth maps with more improvements. The computing apparatus may iteratively perform the depth refinement 510 based on a number of iterations set by a user.

For example, when the number of iterations is set to two, an operation of the computing apparatus may iteratively perform the depth refinement process twice based on the set number of iterations, as illustrated in FIG. 6.

FIG. 7 illustrates an example apparatus with depth map improvement. A computing apparatus 700 may include a reconstruction network 760 for 3D modeling in a computing apparatus, such as in the computing apparatus 400 described above with reference to FIG. 4, which is illustrated in FIG. 7 for convenience of explanation. Accordingly, descriptions 701 to 750 may correspond to descriptions 401 to 450 represented above with reference to FIG. 4. Thus, example descriptions different from those illustrated in FIG. 4 are represented below.

The computing apparatus 700 may apply the improved depth map 750 to the reconstruction network 760 and reconstruct a 2D object, corresponding to multi-view depth maps, into a 3D object 770.

In addition, the computing apparatus 700 may reperform a feature fetching, alike the feature fetching 727, using a feature map obtained in intermediate layers of a network 705 or a network 745, together with a sufficient number of 3D points on a world coordinate system for reconstructing a shape of the 3D object 770. Thus, the computing apparatus 700 may obtain feature vectors for each point. The computing apparatus 700 may concatenate the obtained feature vectors and position coordinates (x, y, z) for each point and obtain a probability value of 3D points $\{p_k\}_{k=1}^n$ using a non-linear function. Example non-linear functions may have various configurations, such as a multi-perceptron layer (MPL) and a graphic convolutional network (GCN) as an input, as a non-limiting example. The computing apparatus 700 may reconstruct the 3D object 770 from the probability value of the 3D points $\{p_k\}_{k=1}^n$.

Figure 8:
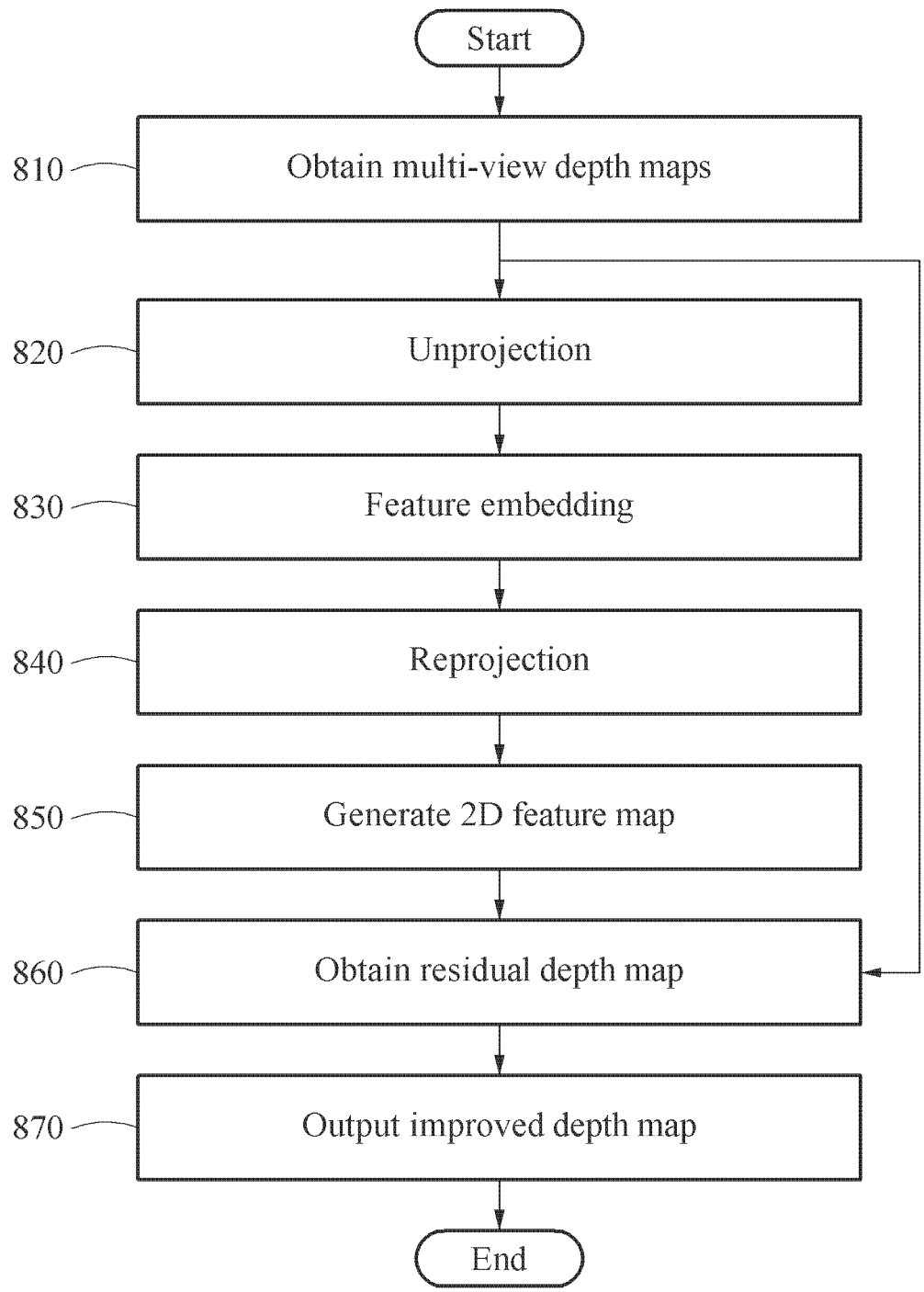
FIG. 8 illustrates an example method with depth map improvement, according to one or more embodiments.

FIG. 8 illustrates an example method with depth map improvement, according to one or more embodiments. In the following examples, operations may be performed sequentially, but may not necessarily be performed sequentially. For example, the operations may be performed in different orders, and at least two of the operations may be performed in parallel.

Referring to FIG. 8, a computing apparatus may generate an improved depth map through operations 810 to 870, for example.

In operation 810, the computing apparatus may obtain multi-view depth maps. The computing apparatus may obtain the multi-view depth maps generated from input images, e.g., 2D RGB images, of different views or obtain the multi-view depth maps from a LiDAR sensor or a depth sensor of different views.

In operation 820, the computing apparatus may unproject the multi-view depth maps obtained in operation 810 into a 3D space using respective camera parameters and/or position information corresponding to each view and form a point cloud corresponding to the multi-view depth maps.

In operation 830, the computing apparatus may apply feature embedding to data represented as the point cloud in operation 820. The computing apparatus may apply feature embedding to all points in the point cloud and obtain features in a vector form, that is, feature embedding vectors.

In operation 840, the computing apparatus may reproject the feature embedding vectors obtained in operation 830 into a camera plane of the set view.

In operation 850, the computing apparatus may generate a 2D feature map including features as many as numbers of the feature embedding vectors that are reprojected into the camera plane of the set view in operation 840.

In operation 860, the computing apparatus may apply the 2D feature map generated in operation 850 to a refinement network for improving a depth and obtain a residual depth map. Here, the computing apparatus may apply the input image of the set view and the 2D feature map of the set view generated in operation 850 and obtain the residual depth map.

In operation 870, the computing apparatus may concatenate the residual depth map obtained in operation 860 and an initial depth map, that is, the depth map of the set view among the multi-view depth maps, adjust any one or any combination of a shift, a scale, and an image quality of the result of the concatenation, and output the generated improved depth map.

The operations of FIG. 8 include any one, any combination, or all operations described above with respect to FIGS. 1-7 and 9.

FIG. 9 illustrates an example apparatus with depth map improvement, according to one or more embodiments. Referring to FIG. 9, a computing apparatus 900 may include a sensor 910, a processor 920, a communication interface 930, a display 940, and a memory 950. The sensor 910, the processor 920, the communication interface 930, the display 940, and the memory 950 may be connected to each another through a communication bus 905. The computing apparatus 900 may be any of the computing apparatuses described above with respect to FIGS. 1-8.

The computing apparatus 900 may be implemented as, or as a portion of, a mobile device such as a mobile phone, a smart phone, a personal digital assistant (PDA), a netbook, a tablet computer, a laptop computer, and the like, a wearable device such as a smart watch, a smart band, smart glasses, and the like, a computer device such as a desktop, a server, and the like, a home appliance such as a television (TV), a smart TV, a refrigerator, and the like, a security device such as a door lock, and the like, a medical device, and a smart vehicle, but embodiments are not limited thereto.

The sensor 910 may obtain multi-view depth maps. For example, the sensor 910 may be a depth sensor or a LiDAR sensor, but is not necessarily limited thereto. The sensor 910 may be an image sensor and capture a plurality of images of different views, from which the processor 920 may respectively derive the multi-view depth maps.

The processor 920 may unproject the multi-view depth maps into a 3D space using respective camera parameter and/or respective camera position information corresponding to each view and form a point cloud corresponding to the multi-view depth maps. The processor 920 may extract feature embedding vectors corresponding to all points in the point cloud. The processor 920 may generate a 2D feature map of a set view (or respective 2D feature maps of all different views in the multi-view depth maps) based on the feature embedding vectors of all points in the point cloud. The processor 920 may apply the 2D feature map to a refinement network stored in the memory 950 for improving a depth and to generate a residual depth map. The processor 920 may concatenate the residual depth map and the depth map of the set view among the multi-view depth maps and generate an improved depth map. Respective residual maps for each of the 2D features maps may similarly be generated, and corresponding concatenations performed to generate all improved depth maps of the different views in the multi-view depth maps. The processor 920 may be configured to perform any one, any combination, or all operations described above with respect to FIGS. 1-8.

The communication interface 930 may output the improved depth map generated by the processor 920. The communication interface 930 may receive an input image including a plurality of frames capturing different views of the same object, e.g., by the sensor 910 when the sensor 910 captures images. In such case, the processor 920 may apply each of the input images, including input images of different views, received through the communication interface 930 to a network for generating respective single view depth maps of the different views of the multi-view depth maps.

In addition, the processor 920 may reconstruct a 2D object corresponding to the multi-view depth maps into a 3D object based on the improved depth map. In such case, the display 940 may display the 3D object reconstructed by the processor 920.

The memory 950 may store networks for improving the depth. The memory 950 may store the network for generating the depth map of the single view. The memory 950 may store a network including various MLPs. The memory 950 may store all networks and models described herein.

The memory 950 may store various information generated in the processing processes of the processor 920 described above. The memory 950 may also store various data and programs. The memory 950 may include a volatile memory or a non-volatile memory. The memory 950 may include a large-capacity storage medium such as a hard disk to store the various data.

The processor 920 may execute executable instructions stored in the memory 950. When executed by the processor, the instructions may configure the processor to perform any one, any combination, or all operations described with respect to FIGS. 1-9. The processor 920 may further execute any number of programs and control the computing apparatus 900 accordingly. Thus, various program codes to be executed by the processor 920 may be stored in the memory 950.

The processor 920 may be hardware including a circuit having a physical structure to perform desired operations. For example, the desired operations may include such instructions and code of the various programs. The hardware-implemented processor 920 or any computing apparatuses described herein are representative of including, for example, a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU), as non-limiting examples.

The computing apparatuses, the image sensors, image cameras, depth sensors, depth cameras, sensor, processors, communication interfaces, displays, memories, and busses, and other apparatuses, devices, units, modules, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE- PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A processor-implemented method, the method comprising:
   generating points for a point cloud by unprojecting multi-view depth maps, of plural views, into a corresponding three-dimensional (3D) space using respective camera parameters corresponding to each view of the multi-view depth maps;
   extracting feature embedding vectors corresponding to the generated points;
   generating a two-dimensional (2D) feature map of a set view based on the extracted feature embedding vectors;
   generating a residual depth map using a refinement network with respect to the 2D feature map; and
   generating a new depth map based on the residual depth map and an initial depth map, of the set view, among the multi-view depth maps.

2. The method of claim 1, further comprising:
   generating the multi-view depth maps using a depth map generation network respectively provided each of a plurality of frames, of multiple views, of a same object,
   wherein the depth map generation network is configured to generate a depth map of a view corresponding to a captured view of a frame, of the plurality of frames, provided to the depth map generation network.

3. The method of claim 1, wherein the extracting of the feature embedding vectors comprises extracting, for each of a plurality of the generated points, a feature embedding vector for a respective point by generating a feature of the feature embedding vector based on:
   a first information with respect to a first depth map, of the multi-view depth maps, corresponding to the respective point; and
   a second information with respect to a different view second depth map, of the multi-view depth maps, corresponding to the respective point.

4. The method of claim 1, wherein the generating of the new depth map comprises:
   concatenating the residual depth map and the initial depth map; and
   generating the new depth map by adjusting any one or any combination of a shift, a scale, and an image quality of a result of the concatenating.

5. The method of claim 1, further comprising:
   repeating, a set number of iterations:
   a generation of respective points for another point cloud by unprojecting respective multi-view depth maps, including an immediately previous generated respective new multi-view depth map, into the corresponding three-dimensional (3D) space;
   an extraction of respective feature embedding vectors corresponding to the generated respective points;
   a generation of a respective two-dimensional (2D) feature map of the set view based on the extracted respective feature embedding vectors;
   a generation of a respective residual depth map using the refinement network with respect to the respective 2D feature map; and
   a generation of a respective new depth map based on the respective residual depth map and a corresponding depth map, of the set view, among the respective multi-view depth maps,
   wherein, in an initial iteration of the set number of iteration, the immediately previous generated respective new multi-view depth map is the generated new depth map.

6. The method of claim 1, further comprising:
   reconstructing a 2D object, corresponding to the multi-view depth maps, into a 3D object based on the new depth map.

7. A non-transitory computer-readable storage medium storing instructions that, when executed by a processor, cause the processor to perform the method of claim 1.

8. The method of claim 2, wherein the plurality of frames include frames with red, green, and blue (RGB) channels.

9. The method of claim 2, wherein the extracting of the feature embedding vectors comprises:
   for each of a plurality of positions of the point cloud,
      extracting a feature embedding vector by concatenating respective features for a corresponding position, of the plurality of positions, and a corresponding point of the generated points,
   where the respective features for the corresponding position are fetched from each feature map generated with respect to respective final layers of the depth map generation network when respectively generating depth maps, of the multi-view depth maps, that correspond to the corresponding position.

10. The method of claim 9, wherein, for generating one of the feature embedding vectors, the fetching includes:

fetching a first feature, for a particular position of the plurality of positions, from a first feature map generated by an intermediary layer of the depth map generation network when generating a first depth map, of the multi-view depth maps, that corresponds to the particular position; and fetching a second feature for the particular position from a second feature map generated by the intermediary layer of the depth map generation network when generating a second depth map, of the multi-view depth map, that corresponds to the particular position.

11. The method of claim 2, wherein the generating of the 2D feature map comprises generating the 2D feature map of the set view by projecting the feature embedding vectors into an image plane of the set view.

12. The method of claim 2, further comprising:
reconstructing a 2D object, corresponding to the multi-view depth maps, into a 3D object based on the new depth map.

13. The method of claim 2, wherein the generating of the residual depth map comprises:
generating the residual depth map by applying a frame, of the plurality of frames, of the set view and the 2D feature map to the refinement network.

14. The method of claim 13, wherein the generating of the residual depth map comprises:
generating the residual depth map by adding channels of the frame to the 2D feature map and applying the 2D feature map with the added channels to the refinement network.

15. The method of claim 2, wherein the generating of the new depth map comprises:
concatenating the residual depth map and the initial depth map; and
generating the new depth map by adjusting any one or any combination of a shift, a scale, and an image quality of a result of the concatenating.

16. The method of claim 2, further comprising:
repeating, a set number of iterations:
a generation of respective points for another point cloud by unprojecting respective multi-view depth maps, including an immediately previous generated respective new multi-view depth map, into the corresponding three-dimensional (3D) space;
an extraction of respective feature embedding vectors corresponding to the generated respective points;
a generation of a respective two-dimensional (2D) feature map of the set view based on the extracted respective feature embedding vectors;
a generation of a respective residual depth map using the refinement network with respect to the respective 2D feature map; and
a generation of a respective new depth map based on the respective residual depth map and a corresponding depth map, of the set view, among the respective multi-view depth maps,
wherein, in an initial iteration of the set number of iteration, the immediately previous generated respective new multi-view depth map is the generated new depth map.

17. The method of claim 1, wherein the generating of the 2D feature map comprises generating each of plural 2D feature maps, of the plural views, by respectively projecting the feature embedding vectors into respective image planes of the plural views.

18. The method of claim 17, wherein the generating of the residual depth map comprises generating plural residual depth maps of the plural views, including:
for each of the generated plural 2D feature maps of the plural views, generating a corresponding residual depth map of a respective view, of the plural views, using the refinement network respectively provided a corresponding 2D feature map of the respective view.

19. The method of claim 18, wherein the generating of the new depth map comprises generating respective new depth maps of the plural views, including:
for each of the generated plural residual depth maps,
concatenating, with respect to the respective view, the corresponding residual depth map and a corresponding depth map, among the multi-view depth maps, of the respective view; and
generating a respective new depth map of the respective view by adjusting any one or any combination of a shift, a scale, and an image quality of a result of the concatenating with respect to the respective view.

20. The method of claim 18, wherein the generating of the new depth map comprises generating, for each of the generated plural residual depth maps, a respective new depth map of the respective view based on the corresponding residual depth map and a corresponding depth map, among the multi-view depth maps, of the respective view, and
wherein the method further comprises repeating, a set number of iterations:
a generation of respective points for another point cloud by unprojecting immediately previous generated respective multi-view depth maps into the corresponding three-dimensional (3D) space;
an extraction of respective feature embedding vectors corresponding to the generated respective points;
a generation of a respective two-dimensional (2D) feature map of the set view based on the extracted respective feature embedding vectors;
a generation of a respective residual depth map using the refinement network with respect to the respective 2D feature map; and
a generation of a respective new depth map based on the respective residual depth map and a corresponding depth map, of the set view, among the immediately previous generated respective multi-view depth maps,
wherein, in an initial iteration of the set number of iteration, the immediately previous generated respective multi-view depth maps are the generated respective new depth maps.

21. An apparatus, the apparatus comprising:
a sensor; and
a processor configured to:
generate points for a point cloud by unprojecting multi-view depth maps, of plural views, into a corresponding three-dimensional (3D) space using respective camera parameters corresponding to each view of the multi-view depth maps;
extract feature embedding vectors corresponding to the generated points;
generate a two-dimensional (2D) feature map of a set view based on the extracted feature embedding vectors;
generate a residual depth map using a refinement network with respect to the 2D feature map; and
generate a new depth map based on the residual depth map and an initial depth map, of the set view, among the multi-view depth maps, wherein the sensor is configured to capture, with a same object, the multi-view depth maps or a plurality frames, of multiple views, for generating the multi-view depth maps.

22. The apparatus of claim 21, wherein the sensor captures the plurality of frames, and
wherein the processor is further configured to generate the multi-view depth maps using a depth map generation network respectively provided each of a plurality of frames.

23. The apparatus of claim 22, further comprising a communication interface configured to:
output the new depth map; and
receive the plurality of frames.

24. The apparatus of claim 22, wherein, for the extracting of the feature embedding vectors, the processor is configured to:
for each of a plurality of positions of the point cloud,
extract a feature embedding vector by concatenating respective features for a corresponding position, of the plurality of positions, and a corresponding point of the generated points,
where the respective features for the corresponding position are fetched from each feature map generated with respect to respective final layers of the depth map generation network when respectively generating depth maps, of the multi-view depth maps, that correspond to the corresponding position.

25. The apparatus of claim 23, wherein, for the generating of the residual depth map, the processor is configured to:
generate the residual depth map by applying a frame, of the plurality of frames, and the 2D feature map to the refinement network.

26. The apparatus of claim 22, wherein the processor is configured to:
repeat, a set number of iterations:
a generation of respective points for another point cloud by unprojecting respective multi-view depth maps, including an immediately previous generated respective new multi-view depth map, into the corresponding three-dimensional (3D) space;
an extraction of respective feature embedding vectors corresponding to the generated respective points;
a generation of a respective two-dimensional (2D) feature map of the set view based on the extracted respective feature embedding vectors;
a generation of a respective residual depth map using the refinement network with respect to the respective 2D feature map; and
a generation of a respective new depth map based on the respective residual depth map and a corresponding depth map, of the set view, among the respective multi-view depth maps,
wherein, in an initial iteration of the set number of iteration, the immediately previous generated respective new multi-view depth map is the generated new depth map.

27. The apparatus of claim 22, wherein the processor is configured to:
reconstruct a 2D object, corresponding to the multi-view depth maps, into a 3D object based on the new depth map.

28. An apparatus, the apparatus comprising:
a processor configured to:
for each of a plurality of positions for a point cloud, extract a feature embedding vector based on respective features for a corresponding position, of the plurality of positions, and a corresponding point of a plurality of points for the point cloud, where the respective features for the corresponding position are based on features extracted from respective depth maps, of multi-view depth maps of plural views with a same object, that correspond to the corresponding position;
generate a two-dimensional (2D) feature map of a set view based on the extracted feature embedding vectors;
generate a residual depth map using a refinement network with respect to the 2D feature map; and
generate a new depth map based on the residual depth map and an initial depth map, of the set view, among the multi-view depth maps.

29. The apparatus of claim 28, wherein the processor is further configured to generate the plurality of points for the point cloud by unprojecting the multi-view depth maps into a corresponding three-dimensional (3D) space using respective camera parameters corresponding to each view of the multi-view depth maps.

30. The apparatus of claim 28, further comprising a sensor configured to capture the multi-view depth maps,
wherein, for each of the plurality of positions for the point cloud, the features extracted from respective depth maps include features extracted within the depth map generation network when generating the respective depth maps that correspond to the corresponding position.

31. The apparatus of claim 28, further comprising a sensor configured to capture a plurality of frames of multiple views,
wherein the processor is further configured to generate the multi-view depth maps using a depth map generation network respectively provided each of a plurality of frames with the same object,
wherein the depth map generation network is configured to generate a depth map of a view corresponding to a captured view of a frame, of the plurality of frames, provided to the depth map generation network, and
wherein, for each of the plurality of positions for the point cloud, the features extracted from respective depth maps include features extracted within the depth map generation network when generating the respective depth maps that correspond to the corresponding position.

32. The apparatus of claim 28, wherein the processor is further configured to reconstruct a 2D object, corresponding to the multi-view depth maps, into a 3D object based on the new depth map.

* * * * *